: 2,755,251
Patented July 17, 1956

2,755,251

HYDRAULIC FLUID COMPOSITIONS

George E. Barker, Llangollen Estates, Del., assignor to Atlas Powder Company, Wilmington, Del., a corporation of Delaware No Drawing. Application July 17, 1953,
Serial No. 368,839

4 Claims. (Cl. 252—79)

This invention relates to hydraulic fluid compositions and particularly to fluid compositions suitable for transferring energy in hydraulic systems at very low temperatures.

It is the principal object of the invention to provide new and improved hydraulic fluid compositions of very low freezing point.

Other objects of the invention will become apparent in the course of the following description and in the appended claims.

Hydraulic fluids which accomplish the above object in accordance with the invention are solutions of high molecular weight polyglycol ether-esters in mixed solvents comprising lower glycols and alkyl ethers of glycols. More specifically, the high molecular weight ether-esters are condensation products of 1,2 propylene oxide with dimerized, unsaturated, long chain fatty acids. The said dimerized acids are well known and methods for preparing them or their methyl esters are described, for example, by Bradley and Johnson (Ind. Eng. Chem. 33, 86 (1941)), and in U. S. Patent 2,491,350 to Young and Sparks. Particularly preferred is the dimer of linoleic acid which may be prepared from the methyl ester of linoleic acid or from the methyl esters of natural oil acids containing significant fractions of linoleic acid or acids which isomerize to linoleic under the conditions of polymerization.

The ether-esters employed in the compositions are most conveniently prepared by the direct addition of propylene oxide to the said dimerized acids, at elevated temperatures and pressures, continuing the addition until from 20 to 35 molar proportions of propylene oxide have been condensed per mol of dimerized acid. The condensation reaction occurs more readily in the presence of a catalyst. Preferred catalysts are alkaline materials such, for example, as alkali metal hydroxides or alcoholates. When the condensation reaction is complete, the product may be deodorized by blowing with superheated steam or other inert gas under reduced pressure.

The glycol component of the hydraulic fluids of the invention is an alkylene glycol or lower polyalkylene glycol containing from 3 to 10 carbon atoms. Among such glycols may be named propylene glycol, diethylene glycol, dipropylene glycol, hexylene glycol, tetraethylene glycol, tripropylene glycol, 1,10-decanediol, and the like. Mixtures of such glycols may be advantageously employed.

The third component of hydraulic fluids in accordance with the invention is a mono-alkyl glycol ether containing from 4 to 8 carbon atoms. Among such ethers may be named the butyl ether of ethylene glycol, the ethyl ether of ethylene glycol, the ethyl ether of diethylene glycol, the isopropyl ether of propylene glycol and the like.

In describing the compositions of the invention it is convenient to consider the mixture of glycol and glycol ether as a solvent for the linoleic dimer ether-ester. Employing this concept, the solvent comprises from 2 to 4 parts of the said glycol-ether per part of glycol and the hydraulic fluid comprises a solution of from 10% to 35% by weight of a polyoxypropylene ether-ester of a dimerized unsaturated acid as hereinbefore described in the said solvent. The ether-ester, the glycol and the glycol-ether are the essential components of the hydraulic fluid. It will be readily apparent to those skilled in the art that minor adjuvants may be introduced such, for example, as coloring agents, corrosion inhibitors, stabilizers against oxidation, or the like. Solutions containing such additives are considered to be within the scope of the invention.

Specific compositions which illustrate the invention are presented in the following examples.

Example 1

250 grams of 20-oxypropylene ether-ester of dimerized linoleic acid was dissolved in 750 grams of a solvent comprising 2 parts butyl ether of ethylene glycol per part of diethylene glycol. A clear solution having a viscosity of 6.7 centistokes at 130° F. and 1170 centistokes at −40° F. was obtained.

Example 2

Substituting 35-oxypropylene ether-ester of linoleic dimer for the ether-ester of Example 1 resulted in a somewhat more viscous composition. Its viscosity at 130° F. was 7.4 centistokes, and at −40° F. was 1439 centistokes.

Example 3

Substituting propylene glycol for the diethylene glycol in Example 1 resulted in a composition with a viscosity of 6.8 at 130° F. and 1625 at −40° F. The compositions remained clear at all temperatures.

Example 4

150 grams of 25-oxypropylene ether-ester of linoleic dimer were dissolved in 850 grams of a solvent comprising 76.5% butyl ether of ethylene glycol, 14.1% diethylene glycol and 9.4% hexylene glycol. The resulting product had a viscosity of 3.8 centistokes at 130° F. and 319 at −40° F. It remained clear and flowed after storage for 24 hours at −88° F.

Example 5

250 grams of 25-oxypropylene ether-ester of linoleic dimer were dissolved in 750 grams of a mixed solvent comprising 20% diethylene glycol, 13.3% hexylene glycol and 66.7% butyl ether of ethylene glycol. The resulting fluid had a viscosity of 6.2 centistokes at 130° F. and 1048 centistokes at −40° F. It became very viscous but did not freeze solid at −88° F.

Example 6

250 grams of 25-oxypropylene ether-ester of linoleic dimer were dissolved in 750 grams of a mixed solvent comprising 20% propylene glycol and 80% ethyl ether of ethylene glycol. The resulting fluid had a viscosity of 4.01 centistokes at 130° F. and 337.6 centistokes at −40° F.

Example 7

The ethyl ether of ethylene glycol of Example 6 was replaced by a commercial mixture of methyl ethers of mixed mono-, di-, and tripropylene glycols (Dowanol 93 B-2) to yield a hydraulic fluid of viscosity 5.54 centistokes at 130° F., and 1300 centistokes at −40° F.

Fluids of the compositions described and exemplified above are particularly suited for the transmission of power in automotive hydraulic systems. They are non-corrosive to metals, do not attack or induce swelling of rubber and plastic parts, have a lubricating action on moving parts, are virtually non-volatile, and will tolerate the presence of small amounts of water such as might be introduced by condensation from atmospheres of high relative humidity.

What is claimed is:

1. A hydraulic fluid of the following composition:

10% to 35% polyoxypropylene condensation product of a dimerized unsaturated long chain fatty acid containing from 20 to 35 oxypropylene groups per mol
65% to 90% mixed solvent consisting essentially of one part of a lower aliphatic glycol and from 2 to 4 parts of a lower alkyl ether of a lower aliphatic glycol.

2. A fluid as in claim 1 wherein the said dimerized acid is dimerized linoleic acid.

3. A hydraulic fluid of the following composition:

15% polyoxypropylene ether-ester of linoleic dimer acid containing 25 oxypropylene groups per mol
12% diethylene glycol
8% hexylene glycol
65% butyl ether of ethylene glycol.

4. A hydraulic fluid of the following composition:

25% polyoxypropylene ether-ester of linoleic dimer acid containing 25 oxypropylene groups per mol
15% propylene glycol
60% ethyl ether of ethylene glycol.

References Cited in the file of this patent

UNITED STATES PATENTS 2,588,970   Esposito _____ Mar. 11, 1952